US 6,844,958 B2

(12) United States Patent
Kawai

(10) Patent No.: US 6,844,958 B2
(45) Date of Patent: Jan. 18, 2005

(54) ELECTROPHORETIC DEVICE, METHOD OF MANUFACTURING THE SAME, ELECTRONIC APPARATUS, MICROCAPSULE, AND METHOD OF MANUFACTURING MICROCAPSULE

(75) Inventor: Hideyuki Kawai, Nagano-ken (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/278,715

(22) Filed: Oct. 23, 2002

(65) Prior Publication Data

US 2003/0086149 A1 May 8, 2003

(30) Foreign Application Priority Data

Nov. 5, 2001 (JP) ........................................ 2001-339682

(51) Int. Cl.[7] ............................................ G02B 26/00
(52) U.S. Cl. ...................................................... 359/296
(58) Field of Search ................................. 359/296, 237, 359/250, 253, 265–273, 315; 349/86, 90, 296; 345/107; 424/489, 490; 428/402.21, 402.24

(56) References Cited

U.S. PATENT DOCUMENTS 5,827,531 A * 10/1998 Morrison et al. ........... 424/450
6,392,786 B1 * 5/2002 Albert ........................ 359/296
6,400,492 B1 * 6/2002 Morita et al. ............... 359/296
6,514,328 B1 * 2/2003 Katoh et al. .............. 106/31.28
6,525,865 B2 * 2/2003 Katase ........................ 359/296
6,577,433 B1 * 6/2003 Lin et al. ..................... 359/296
2001/0005567 A1 * 6/2001 Harada et al. ................. 430/32
2003/0142062 A1 * 7/2003 Turner et al. ................ 345/107

FOREIGN PATENT DOCUMENTS

JP 59-171931 9/1984
JP 01-248182 10/1989

* cited by examiner

Primary Examiner—Ricky Mack
Assistant Examiner—Brandi N Thomas
(74) Attorney, Agent, or Firm—Harness, Dickey & Pierce, P.L.C.

(57) ABSTRACT

An electrophoretic device capable of realizing an improvement in response and long-term maintenance of good contrast, a method of manufacturing an electrophoretic device, an electronic apparatus, a microcapsule, and a method of manufacturing a microcapsule. The inner wall of a microcapsule 3 is coated with a hydrophobic material 8A having a hydrophobic functional group possessed by a surfactant 8.

12 Claims, 10 Drawing Sheets

(a)

(b)

_US 6,844,958 B2_

ELECTROPHORETIC DEVICE, METHOD OF MANUFACTURING THE SAME, ELECTRONIC APPARATUS, MICROCAPSULE, AND METHOD OF MANUFACTURING MICROCAPSULE

BACKGROUND OF THE INVENTION

1. Technical Field of the Invention

The present invention relates to an electrophoretic device using an electrophoretic phenomenon, a method of manufacturing the electrophoretic device, an electronic apparatus, a microcapsule, and a method of manufacturing the microcapsule.

2. Discussion

An electrophoretic phenomenon generally uses an electric double layer produced in an interface between a solid (charged particle) and a liquid (dispersion medium), and represents a phenomenon in which a charged particle migrates to an electrode having polarity opposite to the charge possessed by the charged particle by using, as motive power, the force exerted by an electric field.

An electrophoretic display (EPD) using such a phenomenon has a simple structure, a wide viewing angle, a high contrast ratio, a low driving voltage, low power consumption and the ability to hold a display image (referred to as a "memory effect" hereinafter), and attracts attention as a display having various characteristics which cannot be easily realized by a CRT (Cathode Ray Tube) display and a liquid crystal display.

The electrophoretic display comprises a pair of substrates, and an electrophoretic dispersion liquid which is sealed between the substrates with partitions provided therebetween, and which comprises charged particles basically positively or negatively charged, and a liquid dispersion medium having an insulating property, an electrode being formed on the inner side of each of the substrates. In this display, when a voltage is applied between the substrates, the charged particles migrate to the electrode having polarity opposite to the charge possessed by the charged particles. In this case, the charged particles and the dispersion medium are colored in different colors to permit a display on one of the substrate sides.

Namely, when the charged particles move to one of the substrates, which serves as a display surface, the color possessed by the charged particles is recognized, while when the charged particles move to the other substrate, the color of the dispersion medium is recognized.

In the electrophoretic display, charge is held by the electrodes when a circuit is opened immediately after a voltage is applied, and thus the charged particles can be adsorbed by the Coulomb's force of the charge held by the electrodes. Namely, a certain still image can continuously be displayed with no voltage applied.

However, the long-term use of the electrophoretic display having the above construction causes a problem in which adhesion of the charged particles to the electrodes proceeds to deteriorate display response and contrast.

In order to solve this problem, Japanese Unexamined Patent Application Publication No. 59-1719431 discloses means for forming a polyimide thin film having a thickness of 5 nm or less on the surface of an electrode. Also, Japanese Unexamined Patent Application Publication No. 01-248182 discloses means for forming a fluorocarbon resin thin film on the surface of an electrode.

These adhesion preventing means cause a repulsive force between the hydrophobic surface of the electrode and the hydrophilic surfaces of the charged particles to suppress adhesion of the charged particles to the electrode, thereby improving display response and permitting long-term maintenance of good contrast.

Another known example of the construction of the electrophoretic display is a microcapsule-type electrophoretic display in which an electrophoretic dispersion liquid comprising charged particles and a dispersion medium is enclosed in a plurality of microcapsules, and the microcapsules are held between a pair of substrates.

However, in the microcapsule-type electrophoretic display, the microcapsules are present between an electrode and the charged particles, and it is thus difficult to use the above-described adhesion preventing means.

The present invention has been achieved in consideration of the above-described conditions, and an object of the present invention is to provide an electrophoretic device capable of realizing an improvement in display response and long-term maintenance of good contrast, a method of manufacturing an electrophoretic device, an electronic apparatus, a microcapsule, and a method of manufacturing a microcapsule.

SUMMARY OF THE INVENTION

In order to achieve the object, in a first aspect of the present invention, an electrophoretic device comprises a plurality of microcapsules each containing an electrophoretic dispersion liquid comprising charged particles and a dispersion medium, wherein the inner walls of the microcapsules are coated with a hydrophobic material having a hydrophobic functional group.

In the electrophoretic device of the present invention, the hydrophobic functional group has at least one of an alkyl group, a phenyl group, a benzyl group, and a naphthyl group, and halogenated products of these groups.

In the electrophoretic device of the present invention, the hydrophobic material comprises a hydrophobic portion possessed by or in a surfactant.

A method of manufacturing an electrophoretic device of the present invention, which comprises a plurality of microcapsules each containing an electrophoretic dispersion liquid comprising charged particles and a dispersion medium, comprises the step of mixing a surfactant having at least a hydrophilic functional group and a hydrophobic functional group with at least one of the electrophoretic dispersion liquid and an aqueous solution, and the step of bonding the hydrophilic functional group of the surfactant to the inner walls of the microcapsules at the interface between the electrophoretic dispersion liquid and the aqueous solution.

An electronic apparatus of the present invention comprises a display, and a driving circuit for supplying a driving signal to the display, wherein the display comprises an electrophoretic device. A microcapsule of the present invention has an inner wall coated with a hydrophobic material having a hydrophobic functional group.

A method of manufacturing a microcapsule of the present invention comprises the step of mixing a surfactant having at least a hydrophilic functional group and a hydrophobic functional group with one of a dispersion liquid phase and as aqueous phase, and the step of to bonding the hydrophilic functional group to the inner wall of the microcapsule so that the hydrophilic functional group is arranged in the liquid phase and the hydrophobic functional group is arranged in the aqueous phase at the interface between the liquid phase and the aqueous phase.

In a second aspect of the present invention, an electrophoretic device comprises a plurality of structures each containing an electrophoretic dispersion liquid comprising charged particles and a dispersion medium, wherein at least the surfaces of each of the structures, which are in contact with the electrophoretic dispersion liquid in the migration direction of the charged particles, are coated with a hydrophobic material having a hydrophobic functional group.

Examples of the structures each containing the electrophoretic dispersion liquid include microcapsules, partitions, and the like. For example, in a partition-type electrophoretic device in which an electrophoretic dispersion liquid is held between a pair of substrates with partitions provided therebetween, each of the substrates having an electrode formed on its inner surface, so that charged particles migrate in the lamination direction of the substrates, the surfaces of each of the structures which are in contact with the electrophoretic dispersion liquid in the migration direction of the charged particles are the surfaces of the electrodes. Similarly, in a partition-type electrophoretic device in which charged particles migrate in a direction perpendicular to the lamination direction of the substrates, the surfaces of each of the structures which are in contact with the electrophoretic dispersion liquid in the migration direction of the charged particles are the surfaces of the partitions. In this case, all surfaces in contact with the electrophoretic dispersion liquid may be coated with the hydrophobic material as long as at least the surfaces of each of the structures, which are in contact with the electrophoretic dispersion liquid in the migration direction of the charged particles, are coated with the hydrophobic material.

In the electrophoretic device in the first aspect of the present invention, the inner walls of the microcapsules are coated with the hydrophobic material having the hydrophobic functional group, and thus a repulsive force is produced between the hydrophilic surfaces of the charged particles and the hydrophobic inner surfaces of the microcapsules, thereby suppressing adhesion of the charged particles to the inner walls of the microcapsules. Therefore, it is possible to improve display response and maintain good contrast for a long period of time.

When the hydrophobic functional group contains at least one of an alkyl group, a phenyl group, a benzyl group, and a naphthyl group, and halogenated products of these groups, the display response can be further improved, and good contrast can be maintained for a longer period of time.

When the hydrophobic material comprises a hydrophobic portion of a surfactant, the inner walls of the microcapsules can easily and securely be coated.

The method of manufacturing the electrophoretic device in the first aspect of the present invention can easily realize the electrophoretic device of the present invention.

The electronic apparatus of the present invention comprises the display comprising the electrophoretic device of the present invention, and it is thus possible to realize an improvement in display response and long-term maintenance of good contrast.

The microcapsule of the present invention can easily realize the electrophoretic device of the present invention.

The method of manufacturing the microcapsule of the present invention can easily realize the microcapsule of the present invention. Like in the electrophoretic device in the first aspect of the present invention, in the electrophoretic device in the second aspect of the present invention, it is possible to realize an improvement in display response and long-term maintenance of good contrast.

DESCRIPTION OF THE PREFERRED EMBODIMENTS

An embodiment of the present invention will be described below with reference to the drawings.

In this embodiment, an electrophoretic panel is described as an example of a construction of an electrophoretic device suitable as a display device.

Figure 1:
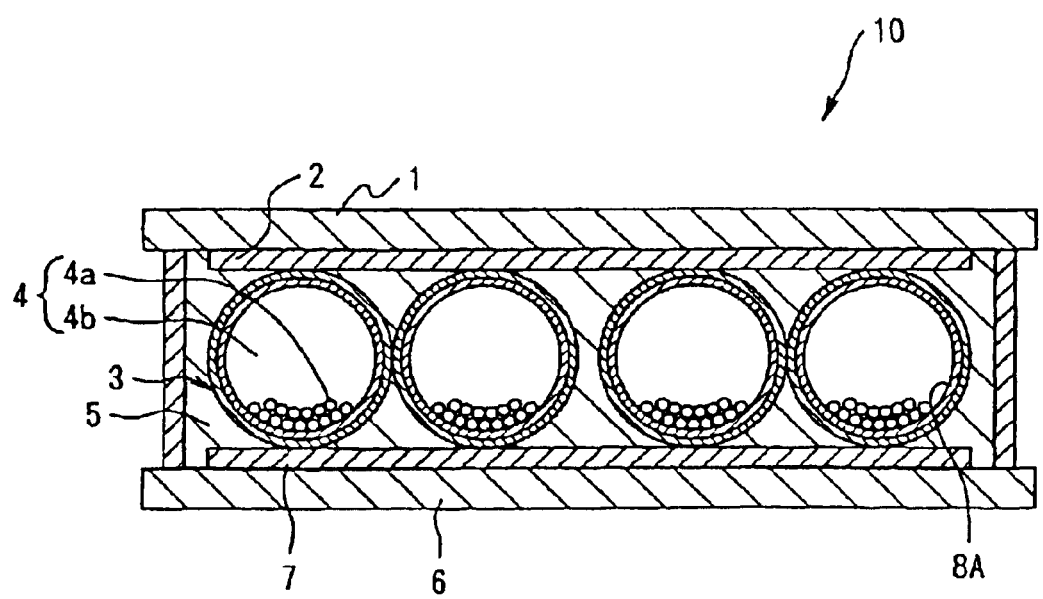
FIG. 1 is a sectional view showing an example of the construction of an electrophoretic panel of the present invention.
Figure 2:
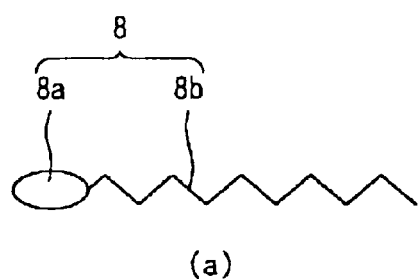
FIG. 2 shows a surfactant constituting a hydrophobic film, in which FIG. 2($a$) is a schematic drawing of the surfactant, and FIG. 2($b$) is a schematic drawing showing a state in which the surfactant is bonded to the inner wall of a microcapsule.
Figure 2:
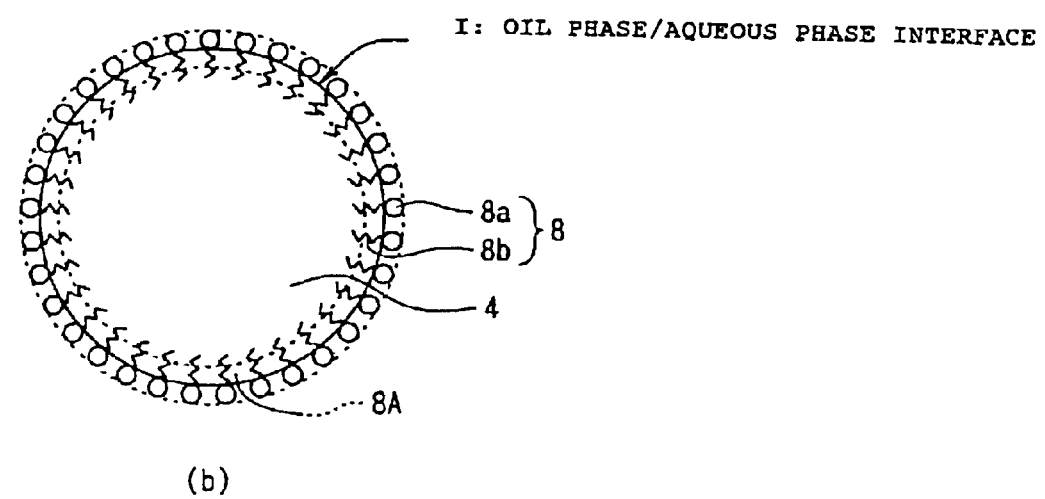

FIG. 1 is a sectional view showing an electrophoretic panel as an example of an electrophoretic device of the present invention. FIG. 1 shows a portion corresponding one pixel of the electrophoretic panel. FIG. 2 shows a surfactant constituting a hydrophobic film, in which FIG. 2($a$) is a schematic drawing of the surfactant, and FIG. 2($b$) is a schematic drawing showing a state in which the surfactant is bonded to the inner wall of a microcapsule.

As shown in FIG. 1, an electrophoretic panel (electrophoretic device) 10 comprises a transparent substrate 1, a counter substrate 6 disposed opposite to the transparent substrate 1, and microcapsules 3 which are sealed between both substrates with a binder 5 The microcapsules 3 function as structures each containing an electrophoretic dispersion liquid 4 comprising charged particles 4$a$ and a dispersion medium 4$b$. The panel 10 also includes a transparent electrode 2 formed on the inner surface (the lower side in FIG. 1) of the transparent substrate 1, and a counter electrode 7 formed on the inner surface (the upper side in FIG. 1) of the counter substrate 6. In the electrophoretic panel 10, the transparent substrate 1 serves as a display surface, and the charged particles 4$a$ are charged with positive polarity.

Each of the transparent substrate 1 and the counter substrate 6 comprises a resin film of polyethylene terephthalate (PET), polyether sulfone (PES), or the like, or an inorganic material such as glass, quartz, or the like. At least the transparent substrate 1 serving as the display surface comprises a light-transmitting material.

For both the transparent electrode 2 and the counter electrode 7, a metal material such as Al, Au, Pt, Ag, Ni, Ti, Cr, or the like can be used. At least the transparent electrode 2 on the display surface side is made of a metal oxide transparent material such as ITO (Indium Tin Oxide), ZnO, $SnO_2$, or the like.

A material which can be charged in the insulating dispersion medium 4b is used for the charged particles 4a so that the charged particles 4a are basically charged positively or negatively. The surfaces of the charged particles 4a are preferably treated by coating with a surfactant or a dispersant for decreasing agglomeration and the specific gravity. The color of the charged particles may be the color of the material used, the color of the colorant added thereto, or the color of the other material laminated on the surfaces of the particles or mixed therewith. Examples of a material for forming the charged particles include titanium oxide (white) and aluminum oxide (white) which are used for utilizing the color of the material, and polyethylene, polystyrene and acrylic resins which are used in a mixture with a coloring agent, and the like. Examples of the coloring agent include black pigments such as aniline black, carbon black, and the like; white pigments such as zinc oxide, antimony trioxide, and the like; azo pigments such as monoazo, disazo and polyazo pigments, and the like; yellow pigments such as isoindolinone, chrome yellow, yellow iron oxide, cadmium yellow, titanium yellow, antimony, and the like; red pigments such as quinacridone red, chromium vermilion, and the like; blue pigments such as iron blue, ultramarine blue, cobalt blue, and the like; green pigments such as phthalocyanine green, and the like; phthalocyanine blue; indanthrene blue; anthraquinone dyes; and the like. These coloring agents are used singly or in a combination of two or more agents. If required, a charge control agent comprising particles of a metal soap, a resin, rubber, varnish, a compound, or the like, a dispersant such as a titanium coupling agent, an aluminum coupling agent, silane coupling agent, or the like, an electrolyte, a surfactant, a lubricant, a stabilizer, etc. may be added to the pigments.

The dispersion medium 4b comprises an insulating liquid which allows the charged particles 4a to be sufficiently stably charged, i.e., substantially a water-insoluble organic solvent. Examples of such a liquid include long-chain alcohol solvents such as dodecanol, undecanol, and the like, poly-carbon ketones such as dibutyl ketone, methyl isobutyl ketone, and the like, aliphatic hydrocarbons such as pentane, hexane, octane, and the like, alicyclic hydrocarbons such as cyclohexane, methyl cyclohexane, and the like, aromatic hydrocarbons such as benzene, toluene, xylene, benzene having a long-chain alkyl group such as hexylbenzene, butylbenzene, octylbenzene, nonylbenzene, decylbenzene, undecylbenzene, dodecylbenzene, tridecylbenzene, tetradecylbenzene, and the like, halogenated hydrocarbons such as methylene chloride, chloroform, carbon tetrachloride, 1,2-dichloroethane, and the like, various oils such as silicone oil, olive oil, and the like. These solvents are used singly or in a mixture. The dispersion medium 4b is colored by dissolving or dispersing a coloring agent such as a dye or the like, and mixed with an ionic surfactant.

The microcapsules 3 can be formed by using a known material, for example, a gum arabic-gelatin composite film, an urethane resin, a melamine resin, an urea resin, or the like. The inner walls of the microcapsules 3 are coated with a hydrophobic film 8A having a hydrophobic functional group. In this embodiment, the hydrophobic film 8A comprises a surfactant 8 having a hydrophilic portion 8a and a hydrophobic portion 8b, as shown in FIG. 2(a).

The hydrophilic portion 8a has a hydrophilic group and a reactive functional group having the function to bond the hydrophilic group to the inner walls of the microcapsules 3.

Examples of the hydrophilic group include anionic hydrophilic groups of carboxylates, sulfates, and the like, cationic hydrophilic groups of trimethylammonium and the like, nonionic hydrophilic groups of polyoxyethyene, sorbitan, and the like, and amphoteric hydrophilic groups.

Examples of the reactive functional group include a hydroxyl group, an amino group, a carboxyl group, a methoxy group, an ethoxy group, and the like. These reactive functional groups may be hydrophilic.

The hydrophobic portion 8b has a hydrophobic functional group which constitutes the hydrophobic film 8A coated on the inner walls of the microcapsules 3, and the chain length and the molecular weight of the hydrophobic portion 8b are determined in consideration of the desired level of hydrophobicity imparted to the film inner walls of the microcapsules 3. Generally, hydrophobicity increases as the chain length and the molecular weight of the hydrophobic portion 8b increase.

Examples of the hydrophobic functional group include a long-chain alkyl group (—R), a phenyl group (—$C_6H_5$), a benzyl group (—$CH_2$-$C_6H_5$), a naphthyl group (—$C_{10}H_7$), and halogenation products thereof.

The surfactant 8 need not have one hydrophilic portion 8a and one hydrophobic portion 8b, and a polymeric surfactant 8 having a plurality of hydrophilic portions 8a and hydrophobic portions 8b may be used.

The binder 5 comprises an acrylic resin formed by polymerizing acrylic acid, methacrylic acid, or an acrylic acid derivative such as methyl acrylate, ethyl acrylate, or the like.

Next, the method of manufacturing the electrophoretic panel 10 having the above construction will be described.

First, a transparent film of ITO is deposited over the entire surface of each of the transparent substrate 1 and the counter substrate 6 each comprising polyethylene terephthalate (PET) by a sputtering method to form the transparent electrode 2 and the counter electrode 7 (the electrode forming step).

Next, titania particles CR-90 (produced by Ishihara Sangyo Kaisha, Ltd.) as the charged particles 4a, dodecylbenzene (produced by Kanto Chemical Industry Co., Ltd.) as the dispersion medium 4b, and titanate coupling agent KR-TTS (produced by Ajinomoto Co., Ltd.) and aluminum coupling agent AL-M (produced by Ajinomoto Co., Ltd.), both of which function as dispersants, are mixed, and the charged particles 4a are dispersed in the dispersion medium 4b by stirring with an ultrasonic wave applied. Then, an anthraquinone blue dye (produced by Chuo Synthetic Chemistry Co., Ltd.) as a coloring agent is dissolved in the resultant dispersion liquid to form the electrophoretic dispersion liquid 4 (liquid phase) comprising the charged particles 4a having a white color and the dispersion medium 4b colored in blue (liquid phase forming step).

In this method, for example, a fluorinated alkylcarboxylic acid potassium salt (produced by Sumitomo 3M Ltd.) is added as the surfactant 8 having the hydrophilic portion 8a and the hydrophobic portion 8b to the electrophoretic dispersion liquid 4. The balance (HLB: Hydrophile-Lypophile Balance) between the hydrophilic portion 8a and the hydrophobic portion 8b of the surfactant 8 affects the size of oil droplets of the electrophoretic dispersion liquid 4 in the emulsification step described below, and is thus determined in consideration of the desired diameter of the microcapsules.

Next, as materials for forming the microcapsules 3, gum arabic and gelatin are weighed at a predetermined ratio, and dissolved in water to form an aqueous solution (aqueous phase) (aqueous phase forming step).

In this step, for example, an amino group of gelatin, urea, melamine, or the like, a carboxyl group of gum arabic, an urethane monomer having a functional group such as a polyhydric alcohol hydroxyl group and used as the wall material of the microcapsules, and a necessary adjuster are preferably dissolved in the aqueous solution.

Next, the electrophoretic dispersion liquid 4 is mixed with the aqueous solution, and then the resultant mixture is stirred to emulsify the aqueous solution and the electrophoretic dispersion liquid 4 to form an O/W (oil droplets in water) emulsion in which oil droplets of the electrophoretic dispersion liquid 4 are dispersed in the aqueous solution (emulsification step).

In this step, the surfactant 8 mixed in the electrophoretic dispersion liquid 4 gathers in the oil phase/aqueous phase interfaces I between the oil droplets (oil phase) of the electrophoretic dispersion liquid 4 and the aqueous solution (aqueous phase), and is arranged in a state in which the hydrophilic portion 8a is directed towards the aqueous solution, and the hydrophobic portion 8b is directed towards the electrophoretic dispersion liquid 4, as shown in FIG. 2(b).

Next, the film walls of the microcapsules 3, which comprise a film of gelatin and gum arabic, are produced in the oil phase/aqueous phase interfaces I by a composite coacervation method so that the microcapsules 3 contain the electrophoretic dispersion liquid 4 comprising the charged particles 4a and the dispersion medium 4b (the step of forming microcapsule wall films).

The method of forming the microcapsule films is not limited to the coacervation method, and for example, any one of an interfacial polymerization method, an in-situ polymerization method, a phase separation method, an interfacial precipitation method, and the like may be used.

Next, the hydrophilic portion 8a of the surfactant 8 is bonded to the inner walls of the microcapsules 3 (bonding step). This bonding step may be performed at the same time as or after the step of forming the microcapsule wall films.

In this step, examples of means for bonding the hydrophilic portion 8a of the surfactant to the inner walls of the microcapsules 3 include a method of adding formaldehyde to produce addition condensation reaction of the reactive functional group contained in the hydrophilic portion 8a of the surfactant 8 and the functional group contained in the monomer used as the material for the microcapsule walls, a method of effecting addition reaction of the reactive functional group contained in the hydrophilic portion 8a and unsaturated bonds contained in the inner walls of the microcapsules 3, and the like.

The sizes of the microcapsules 3 formed as described above are controlled to about 30 to 100 μm by filtration or specific gravity classification. By controlling the sizes of the microcapsules, an excellent display function can be exhibited.

Next, the solution in which the microcapsules 3 are dispersed is concentrated to a microcapsule content of 60% in the solution by using a Buchner funnel.

Next, the solution in which the microcapsule 3 are dispersed and an emulsion of acrylic binder E272 (produced by Mitsui Toatsu Co., Ltd.) 5 are mixed, and the resultant mixture is coated, by a coater, on the counter substrate 6 on which the counter electrode 7 made of ITO is previously formed, and then dried. As a result, a layer of the microcapsules 3 is formed on the upper surface of the counter electrode 7.

Next, the transparent substrate 1 on which the transparent electrode 2 made of ITO is previously formed is superposed on the counter substrate 6 on which the microcapsules 3 are provided to complete the electrophoretic panel 10 having a structure in which a layer of microcapsules 3 is held between the transparent substrate 1 and the counter substrate 6.

Furthermore, in the electrophoretic panel 10, a driving circuit 20 is connected to the transparent electrode 2 and the counter electrode 7 through wiring to form an electrophoretic display (electronic apparatus) 100 comprising the electrophoretic panel 10 serving as a display.

Figure 3:
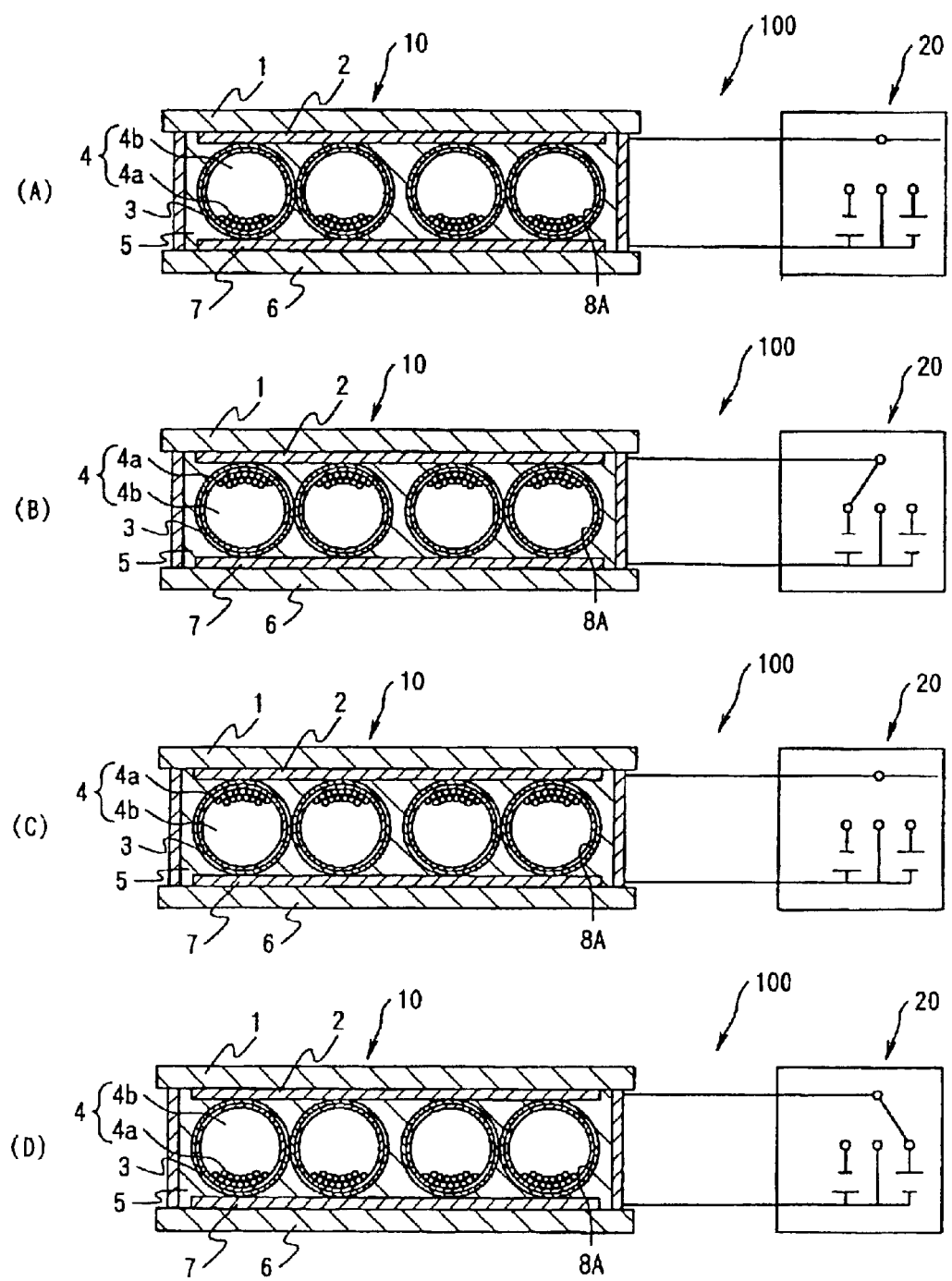
FIG. 3 is a drawing illustrating examples of drives for an electrophoretic display of the present invention.

Examples of drive of the electrophoretic display 100 are described with reference to FIG. 3. FIG. 3 is a drawing illustrating examples of electrical drives for the electrophoretic display 100 of the present invention. FIG. 3 shows a portion corresponding to one pixel of the electrophoretic panel 10.

As shown in FIG. 3(A), with no voltage applied to the transparent electrode 2 and the counter electrode 7, the electrophoretic display 100 is put into a state in which the charged particles 4a contained in the microcapsules 3 are positioned in a lower portion in the figure. Namely, the dispersion medium 4b is recognized on the transparent substrate 1 serving as the display surface, and thus the blue color of the dispersion medium 4b is displayed on the display surface.

In the next state, the driving circuit 20 is connected to induce negative charge in the transparent electrode 2 and positive charge in the counter electrode 7 as shown in FIG. 3(B). Here, the charged particles 4a charged with positive polarity migrate to the transparent electrode 2 in which negative charge is induced. Namely, the charged particles 4a are recognized on the transparent substrate 1 serving as the display surface, and thus the white color of the charged particles 4a is displayed on the display surface.

When the driving circuit 20 is switched to an open state, as shown in FIG. 3(C), charge is held on the transparent electrode 2, and thus the charged particles 4a is adsorbed on the transparent electrode 2 by the Coulomb force of the charge held by the electrode. Namely, with no energy supplied, the charged particles 4a are continuously adsorbed on the transparent electrode 2 serving as the display surface, and thus the white color of the charged particles 4a is continuously displayed on the display surface.

When the driving circuit 20 is connected to induce positive charge in the transparent electrode 2 and negative charge in the counter electrode 7, as shown in FIG. 3(D), the charged particles 4b are released from the Coulomb force of the charge held by the transparent electrode 2 so that the charged particles 4a migrate to the counter electrode 7. Namely, the dispersion medium 4b is recognized on the transparent substrate 1 serving as the display surface, and thus the blue color of the dispersion medium 4b is displayed on the display surface.

In the electrophoretic display 100 having the above construction, the inner walls of the microcapsules 3 are coated with the hydrophobic material 8A having a hydrophobic functional group to produce a repulsive force between the charged particles 4*a* having the hydrophilic surfaces and the microcapsules 3 having the hydrophobic inner surfaces, thereby suppressing adhesion of the charged particles 4*a* to the inner walls of the microcapsules 3. Therefore, it is possible to realize an improvement in display response and long-term maintenance of good contrast.

The hydrophobic material 8A coated on the inner walls of the microcapsules 3 comprises the hydrophobic portion 8*b* of the surfactant 8, and thus the inner walls of the microcapsules 3 can be coated with the hydrophobic material 8A by a simple step.

In the electrophoretic panel 10 of this embodiment, the structures containing the charged particles 4*a* are microcapsules. However, the structures are not limited to the microcapsules, and the present invention can be applied to a partition-type electrophoretic panel 10 in which a structure is formed between a pair of substrates.

The partition-type electrophoretic panel 10 comprises the electrophoretic dispersion liquid 4 which comprises the charged particles 4*a* and the dispersion medium 4*b* and which is contained in the spaces formed by partitions and a pair of substrates each having an electrode formed on its inner surface. In this structure, at least the surfaces in contact with the electrophoretic dispersion liquid 4 in the migration direction of the charged particles 4*a* are coated with the hydrophobic material 8A. For example, in the partition-type electrophoretic device in which the charged particles 4*a* migrate in the lamination direction (towards the major surface) of the substrates, the surfaces of the structure, which are in contact with the electrophoretic dispersion liquid 4 in the migration direction of the charged particles 4*a*, are the surfaces of the electrodes. Similarly, in the partition-type electrophoretic device in which the charged particles 4*a* migrate in a direction perpendicular to the lamination direction of the substrates, the contact surfaces of the structure are the surfaces of the partitions. In this case, all surfaces of the structure in contact with the electrophoretic dispersion liquid 4 may be coated with the hydrophobic material 8A as long as at least the surfaces in contact with the electrophoretic dispersion liquid 4 in the migration direction of the charged particles 4*a* are coated.

An example of the coating method is a method comprising treating the surfaces of the $SiO_2$ partitions, which are in contact with the electrophoretic dispersion liquid 4, to remove reactive functional groups such as a hydroxyl group, and then coating the surfaces with the hydrophobic material having the hydrophobic functional group by addition condensation reaction.

Although, in this embodiment, the electrophoretic display 100 is described as an electronic apparatus comprising the electrophoretic panel 10 of the present invention, the electronic apparatus is not limited to this, and the present invention can be applied to other electronic apparatuses.

Electronic apparatuses such as an electronic paper, an electronic notebook, a display, an electronic book, a mobile personal computer, a cellular phone, a digital still camera, etc. will be disclosed with reference to FIGS. 4 to 10.

Figure 4:
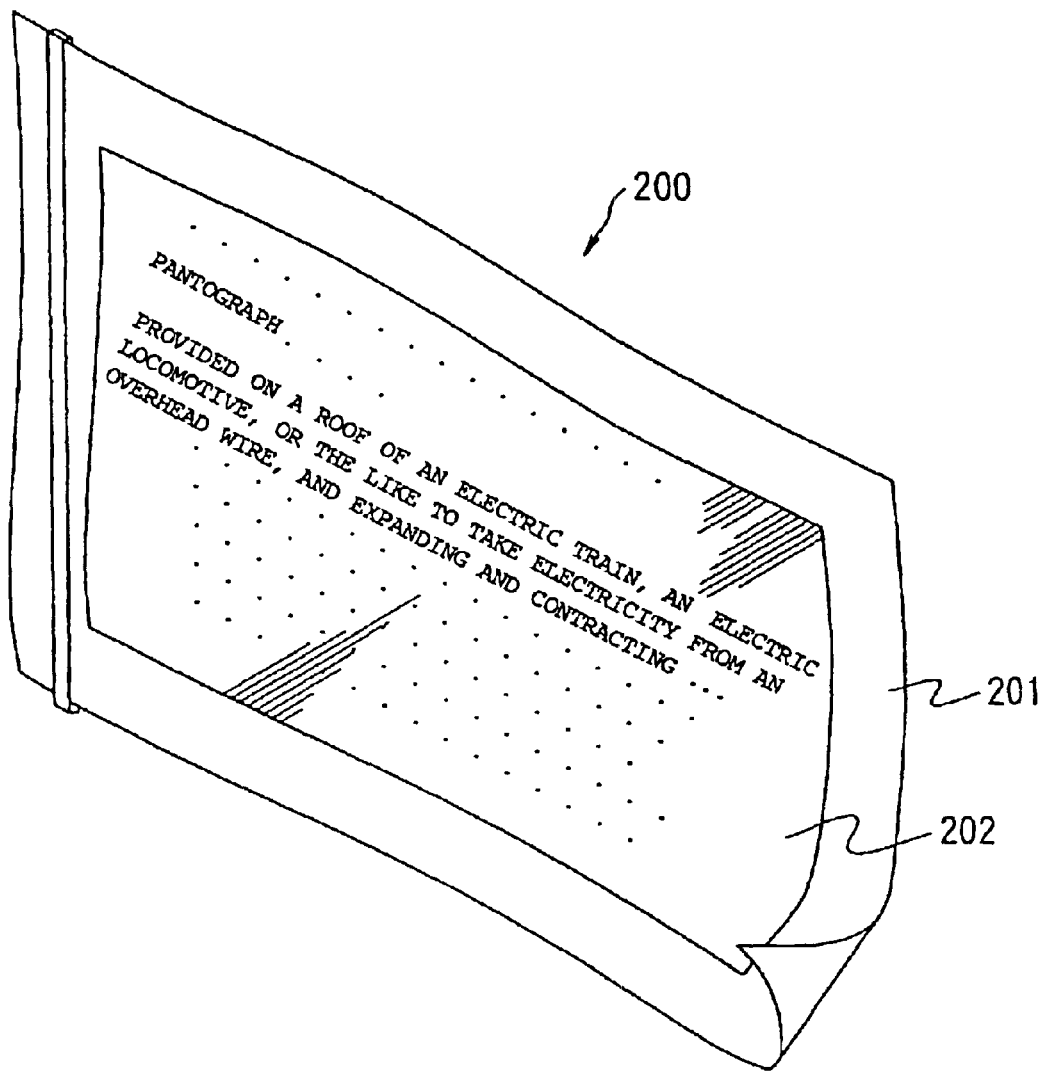
FIG. 4 is a perspective view showing the construction of electronic paper to which an electrophoretic panel of the present invention is applied.

FIG. 4 is a perspective view showing the construction of an electronic paper.

An electronic paper 200 comprises a body 201 comprising a rewritable sheet having the same volume and flexibility as paper, and a display unit 202. In the electronic paper 200, the display unit 202 comprises the above-described electrophoretic panel 10.

Figure 5:
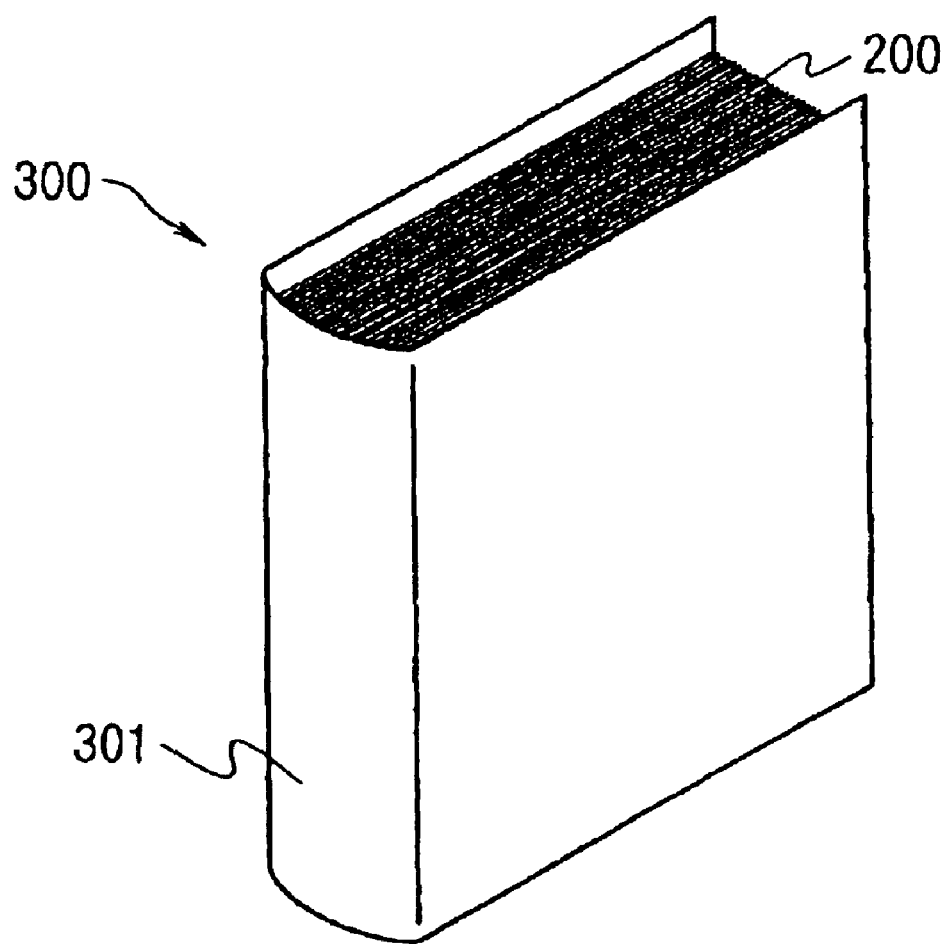
FIG. 5 is a perspective view showing the construction of an electronic book to which an electrophoretic panel of the present invention is applied.

FIG. 5 is a perspective view showing the construction of an electronic book using the electronic paper shown in FIG. 4.

An electronic book 300 comprises a cover 301, and a bundle of sheets of electronic paper 200 held by the cover 301. By providing display data input means on the cover 301, the display contents can be changed with the sheets of electronic paper 200 being bundled. In the electronic book 300, the electronic paper 200 comprises the electrophoretic panel 10.

Figure 6:
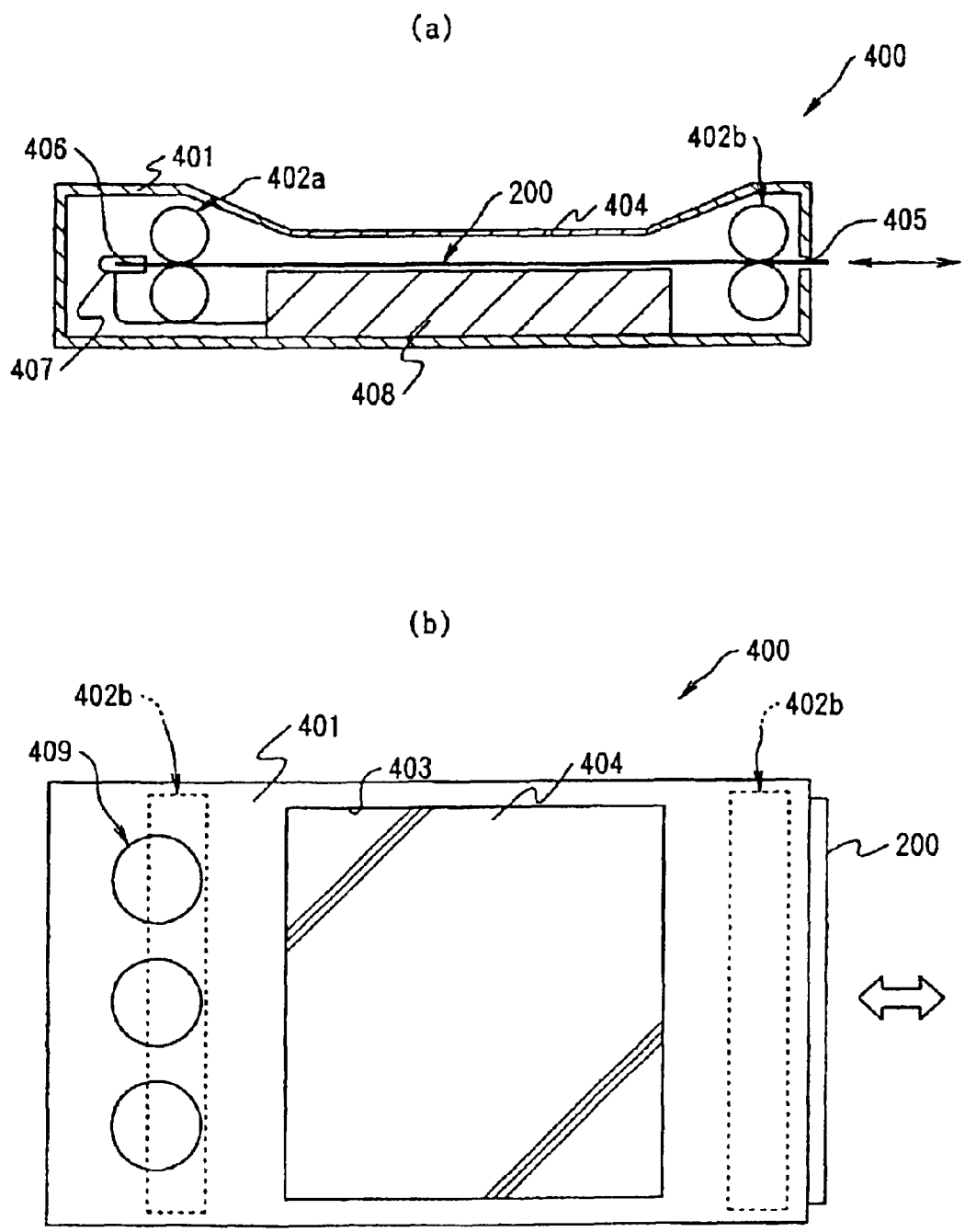
FIG. 6 shows the construction of a display comprising the electronic paper shown in FIG. 4, in which FIG. 6($a$) is a sectional view, and FIG. 6($b$) is a plan view.

FIG. 6 shows the construction of a display comprising the electronic paper shown in FIG. 4, in which FIG. 6(*a*) is a sectional view, and FIG. 6(*b*) is a plan view.

A display 400 comprises a body section 401 comprising two pairs of feed rollers 402*a* and 402*b*, the electronic paper 200 disposed in the body section 401 to be held between the feed roller pairs 402*a* and 402*b*, a transparent glass plate 404 fit into a rectangular hole 403 which is provided on the display surface side (the upper side in FIG. 6(*a*)) of the body section 401, an insertion hole 405 provided at an end of the body section 401 so that the electronic paper 200 can be inserted into and ejected from the body section 401, a controller 408 which can be connected, through a socket 407, to a terminal section 406 provided at the end in the insertion direction of the electronic paper 200, and an operating section 409. In this display 400, the electronic paper 200 comprises the electrophoretic panel 10.

In the display 400, the electronic paper 200 provided on the body section 401 can be seen through the transparent glass plate 404 serving as a display surface. The electronic paper 200 can be inserted into and ejected from the body section 401, and can thus be removed from the body section 401 and used in a portable state.

Figure 7:
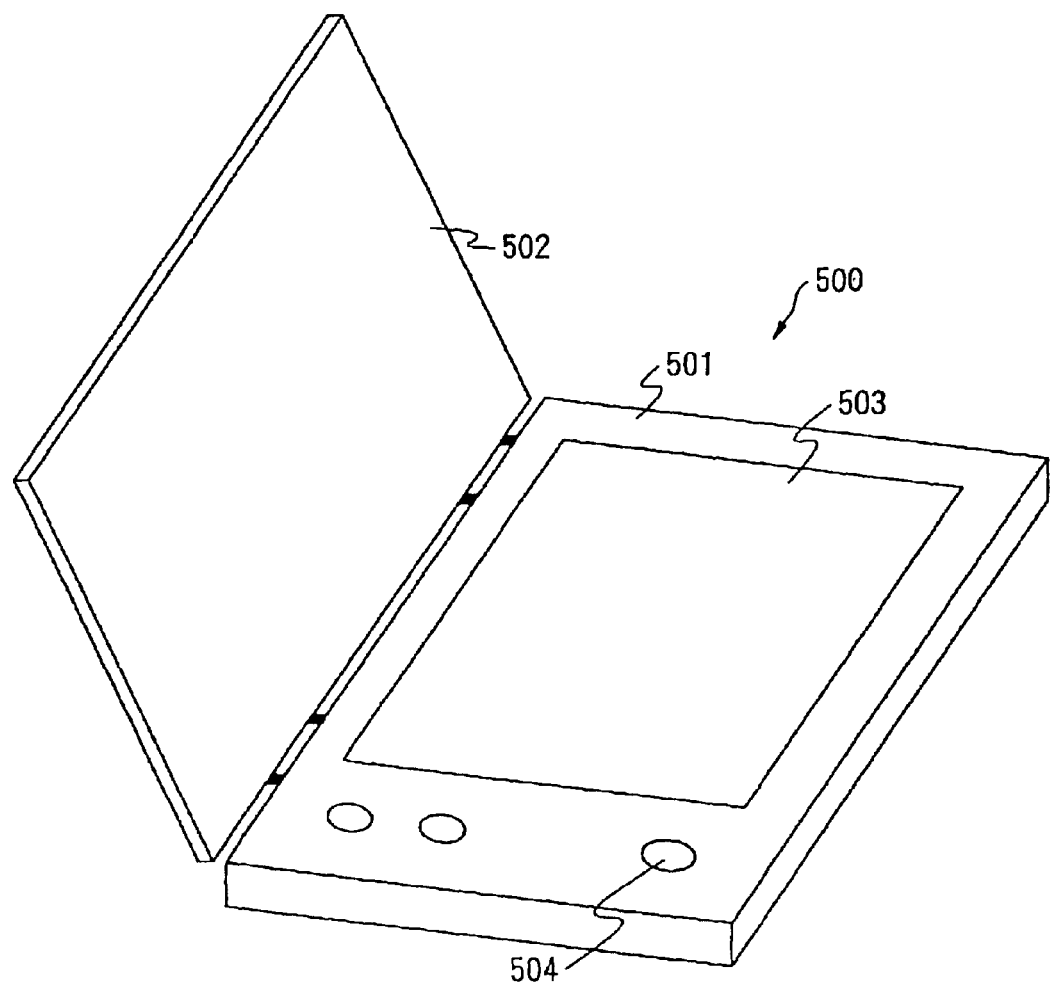
FIG. 7 is a perspective view showing the construction of an electronic notebook to which an electrophoretic panel of the present invention is applied.

FIG. 7 is a perspective view showing the construction of an electronic notebook.

An electronic notebook 500 comprises a book-shaped frame 501, a cover 502 provided on the frame 501 so that it can be opened and closed, a display device 503 having a display surface exposed from the surface of the frame 501, and an operating section 504. In the electronic notebook 500, the display device 503 comprises the electrophoretic panel 10.

Figure 8:
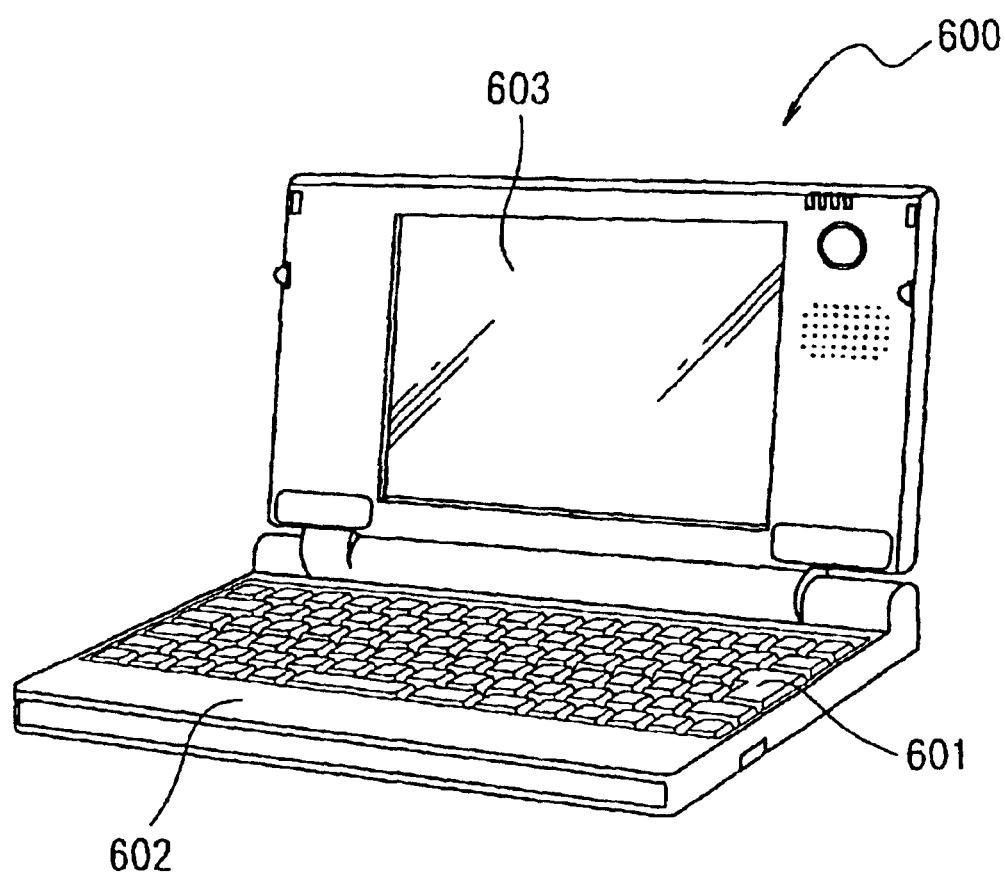
FIG. 8 is a perspective view showing the construction of a mobile personal computer to which an electrophoretic panel of the present invention is applied.

FIG. 8 is a perspective view showing the construction of a mobile personal computer.

A personal computer 600 comprises a body section 602 comprising a keyboard 601, and a display unit 603. In the personal computer 600, the display unit 603 comprises the electrophoretic panel 10.

Figure 9:
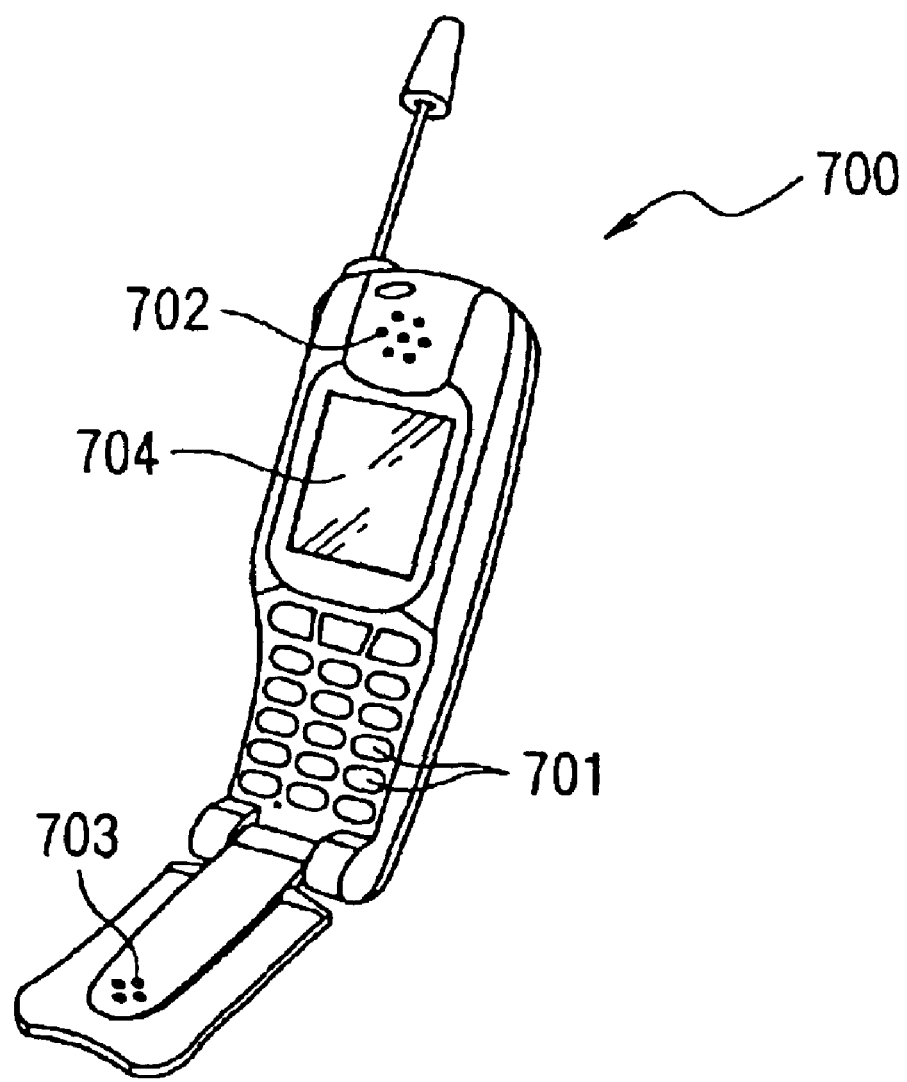
FIG. 9 is a perspective view showing the construction of a cellular phone to which an electrophoretic panel of the present invention is applied.

FIG. 9 is a perspective view showing the construction of a cellular phone.

A cellular phone 700 comprises a plurality of operating buttons 701, an earpiece 702, and a mouthpiece 703, and a display panel 704. In the cellular phone 700, the display panel 704 comprises the electrophoretic panel 10.

Figure 10:
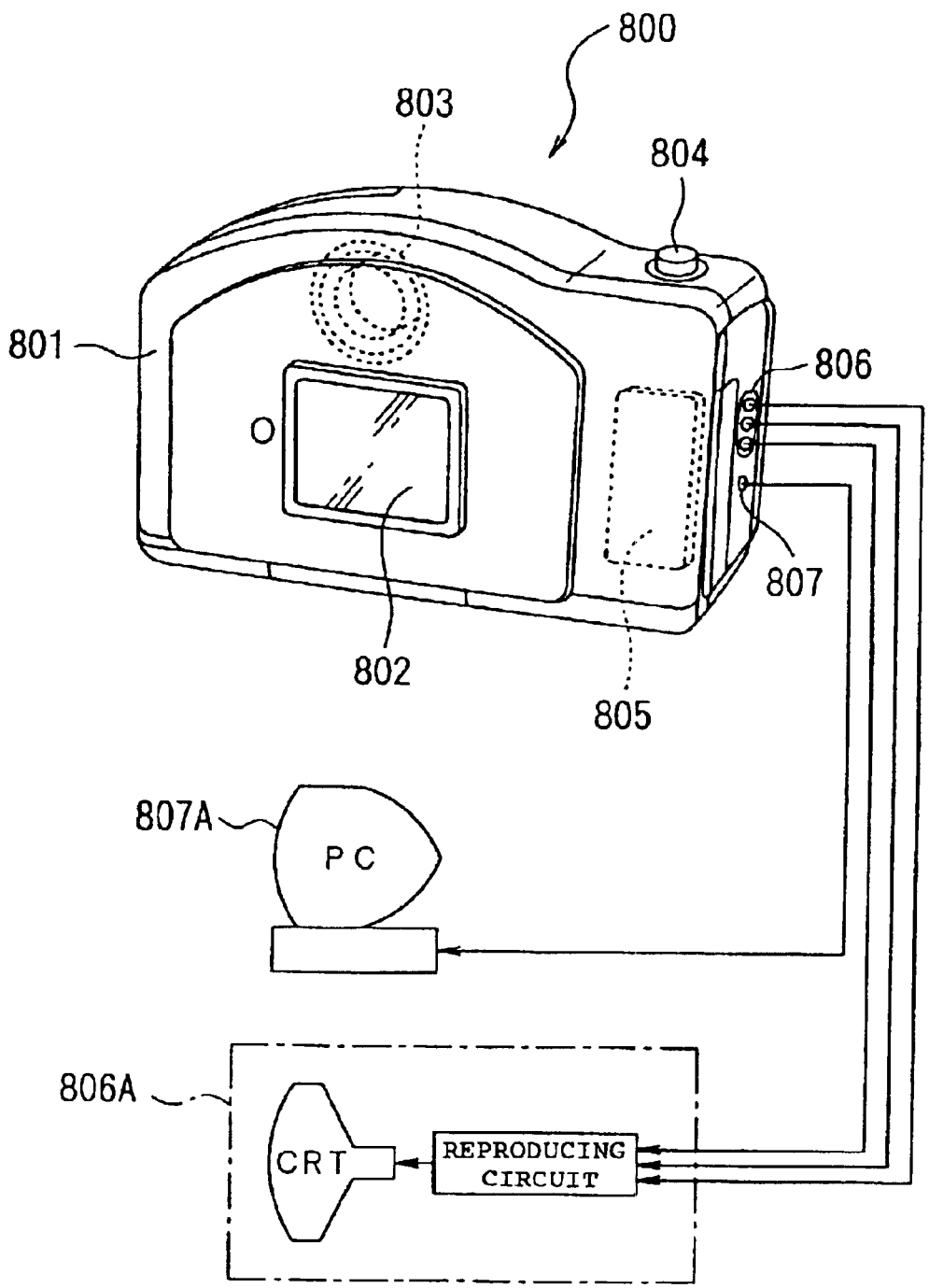
FIG. 10 is a perspective view showing the construction of a digital still camera to which an electrophoretic panel of the present invention is applied.

FIG. 10 is a perspective view showing the construction of a digital still camera. This figure also briefly shows connections with external apparatuses.

A digital still camera 800 comprises a case 801, a display panel 802 formed on the back of the case 801 so that a display is performed based on image signals of CCD (Charge Coupled Device), a light receiving unit 803 comprising an optical lens, the CCD, and the like formed on the observation side (the back of the drawing) of the case 801, a shutter button 804, and a circuit board 805 in which image signals of the CCD are transferred and stored when the shutter button 804 is pushed. In the digital camera 800, the display panel 802 comprises the electrophoretic panel 10.

In the digital still camera 800, video signal output terminals 806 and an input/output terminal 807 for data communication are provided on the side of the case 801. A television monitor 806A is connected to the output terminals 806, and a personal computer 807A is connected to the input/output terminal 807 according to demand. Image signals stored in a memory of the circuit board 805 are output to the television monitor 806A and the personal computer 807A by a predetermined operation.

The electronic apparatuses are not limited to these apparatuses, and other examples include a television, a view finder-type or monitor direct-viewing video tape recorder, a car navigation device, a pager, an electronic notebook, an electric calculator, a word processor, a work station, a picture telephone, a POS terminal, an apparatus with a touch panel, and the like. The electrophoretic panel 10 can be applied to the display sections of these electronic apparatuses.

As described above, in an electrophoretic device of the present invention, the inner walls of microcapsules are coated with a hydrophobic material having a hydrophobic functional group, and thus a repulsive force is produced between charged particles having hydrophilic surfaces and the microcapsules having the hydrophobic inner surfaces, thereby suppressing adhesion of the charged particles to the inner walls of the microcapsules. It is thus possible to realize an improvement in display response and long-term maintenance of good contrast.

Particularly, the hydrophobic functional group contains at least one of an alkyl group, a phenyl group, a benzyl group, and a naphthyl group, and halogenated products of these groups. This is effective to further improve the display response and durability.

When the hydrophobic material comprises a hydrophobic portion contained in a surfactant, the inner walls of the microcapsules can easily securely be coated.

The method of manufacturing an electrophoretic device of the present invention is capable of easily realizing the electrophoretic device of the present invention.

An electronic apparatus of the present invention comprises the electrophoretic device of the present invention as a display section, and thus an improvement in display response and long-term maintenance of good contrast can be realized.

A microcapsule of the present invention can easily realize the electrophoretic device and the electronic apparatus of the present invention.

The method of manufacturing the microcapsule of the present invention can easily realize the microcapsule of the present invention.

Like in the electrophoretic device of the first embodiment of the present invention, in the electrophoretic device of the second embodiment of the present invention, an improvement in display response and long-term maintenance of good contrast can be realized.

The entire disclosure of Japanese Patent Application No. 2001-339682 is incorporated herein by reference.

What is claimed is:

1. An electrophoretic device comprising:
    a plurality of microcapsules including an outer wall and an inner wall;
    wherein each microcapsule contains an electrophoretic dispersion liquid, the liquid including charged particles and a dispersion medium; and
    the microcapsules include a hydrophobic material including a surfactant having a hydrophobic portion and a hydrophilic portion, the hydrophobic portion being inside of the inner wall of the microcapsule.

2. An electrophoretic device according to claim 1, wherein the hydrophobic portion has at least one of an alkyl group, a phenyl group, a benzyl group, and a naphthyl group, and halogenated products of these groups.

3. A method of manufacturing an electrophoretic device having a plurality of microcapsules, the method comprising:
    providing an electrophoretic dispersion liquid including charged particles and a dispersion medium;
    mixing a surfactant having at least a hydrophilic functional group and a hydrophobic functional group with at least one of the electrophoretic dispersion liquid and an aqueous solution; and
    bonding the surfactant to the microcapsules such that the hydrophobic portion is inside of the inner wall of the microcapsule.

4. An electronic apparatus comprising:
    a display and a driving circuit for supplying a driving signal to the display; and
    a plurality of microcapsules including an outer wall and an inner wall;
    wherein each microcapsule contains an electrophoretic dispersion liquid, the liquid including charged particles and a dispersion medium; and
    the microcapsules include a hydrophobic material including a surfactant having a hydrophobic portion and a hydrophilic portion, the hydrophobic portion being inside of the inner wall of the microcapsule.

5. A microcapsule comprising a hydrophobic material which has a hydrophobic functional group, the hydrophobic material coated inside an inner wall of the microcapsule.

6. A method of manufacturing a microcapsule comprising:
    providing an electrophoretic dispersion liquid including charged particles and a dispersion medium;
    mixing a surfactant having at least a hydrophilic functional group and a hydrophobic functional group with at least one of the dispersion liquid phase and an aqueous phase; and
    forming walls of the microcapsule by bonding the hydrophilic functional group to an inner wall of the microcapsule so that the hydrophilic functional group is arranged in the liquid phase and the hydrophobic functional group is arranged in the aqueous phase at an interface between the liquid phase and the aqueous phase, the hydrophobic functional group being inside of the inner wall.

7. An electrophoretic device comprising:
    a plurality of structures each containing an electrophoretic dispersion liquid, the liquid having charged particles and a dispersion medium,
    wherein at least the surfaces of each of the structures, which are in contact with the electrophoretic dispersion liquid in the migration direction of the charged particles, include a hydrophobic material including a surfactant having a hydrophobic portion and a hydrophilic portion, the hydrophobic portion being inside of the surface of the structure.

8. The device of claim 7, wherein the structures are microcapsules.

9. The device of claim 8, wherein the microcapsules are in a display for an electronic book, computer, or camera.

10. A method of forming microcapsules comprising:
    forming an oil solution containing charged particles, a dispersion medium and a dye;

adding a surfactant having a hydrophobic portion and a hydrophilic portion to the oil solution;

mixing an aqueous wall-forming solution with the oil solution to form oil droplets in and aqueous solution, the hydrophilic portion being oriented outwardly towards the aqueous solution;

forming film walls of the microcapsule; and bonding the hydrophilic portion to inner walls of the microcapsule;

wherein the hydrophobic portion is inside of the inner walls of the microcapsule.

11. The electrophoretic device of claim 1, wherein the charged particles have a hydrophilic surface, and a repulsive force is produced between the charged particles having the hydrophilic surface and the inner walls of the microcapsules including the hydrophobic material having the hydrophobic portion.

12. The electrophoretic device of claim 1, wherein the hydrophobic portion suppresses adhesion of the charged particles to the inner walls of the microcapsule.

* * * * *